Jan. 3, 1961
J. E. CHRISTIE
2,967,075
LAND VEHICLE WHEEL
Filed July 31, 1957
4 Sheets-Sheet 3
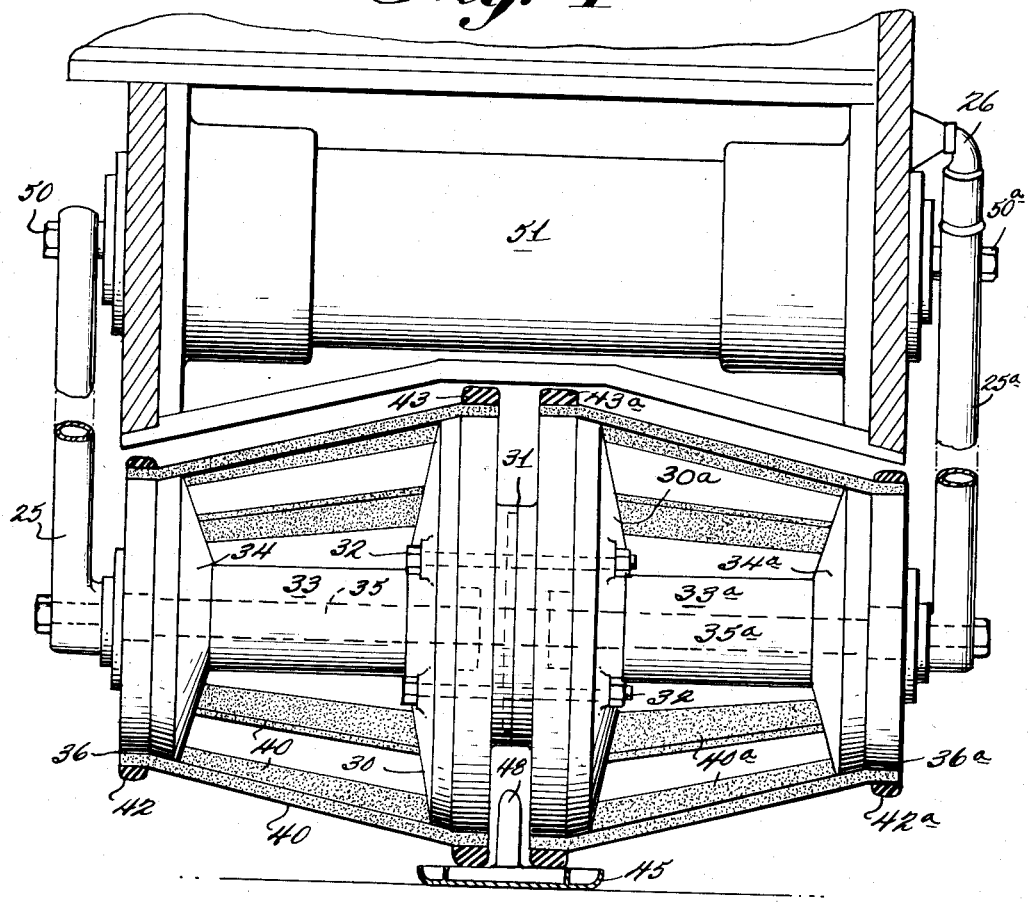
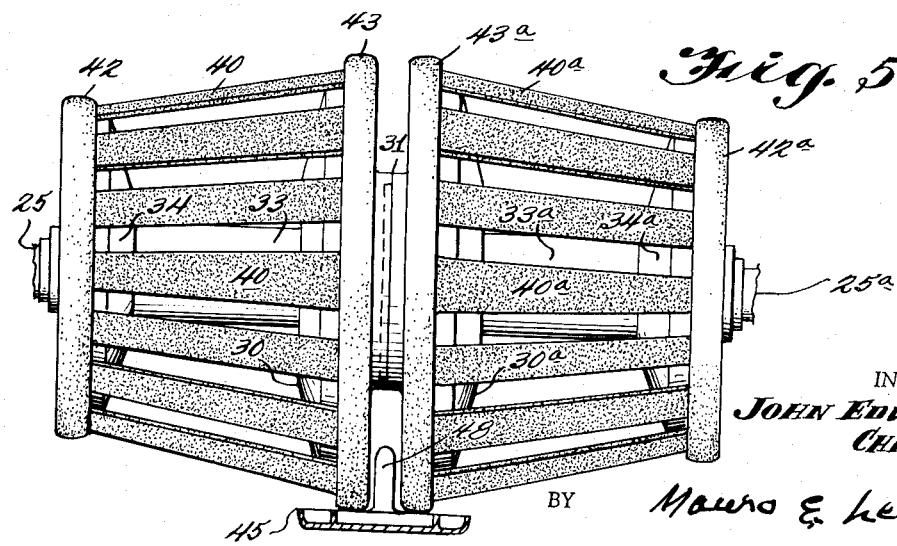
INVENTOR
JOHN EDWARD
CHRISTIE
BY Mauro & Lewis
ATTORNEYS Jan. 3, 1961
J. E. CHRISTIE
2,967,075
LAND VEHICLE WHEEL
Filed July 31, 1957
4 Sheets-Sheet 4
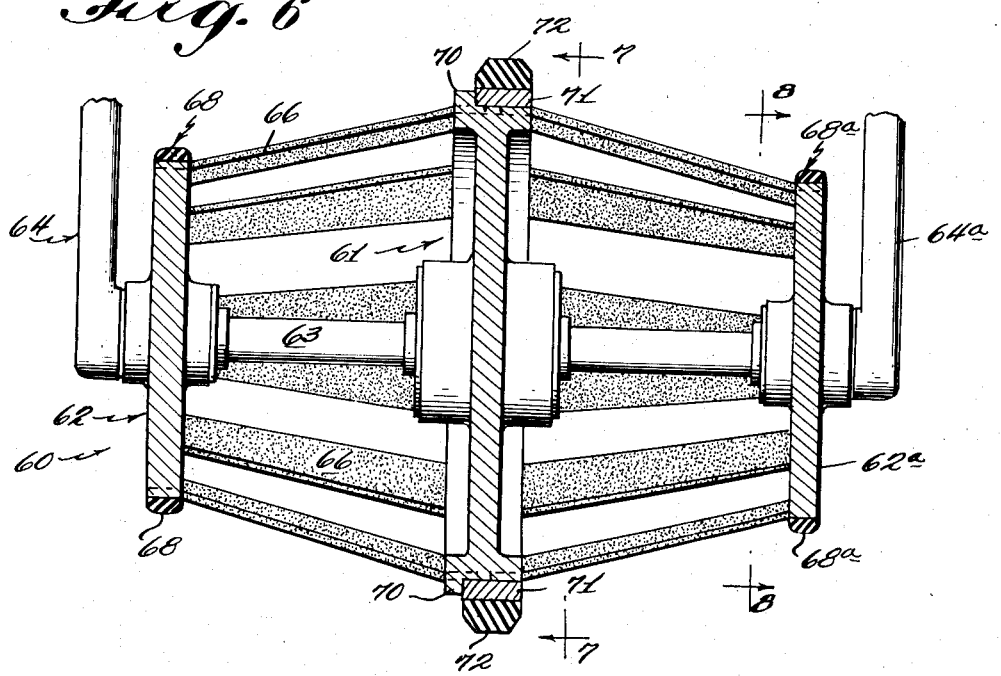
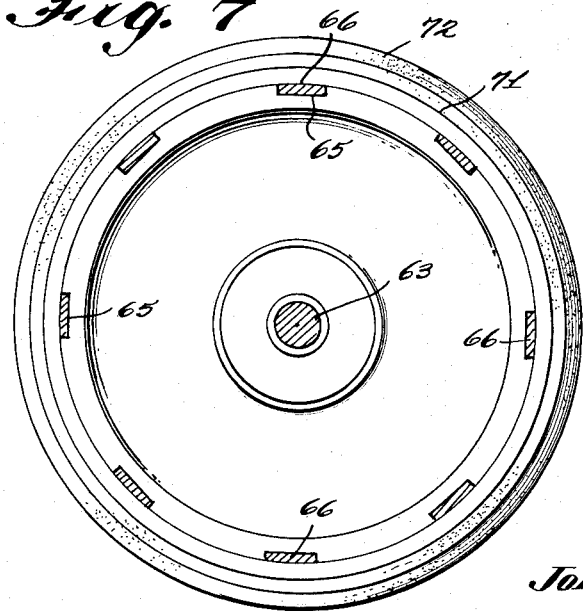
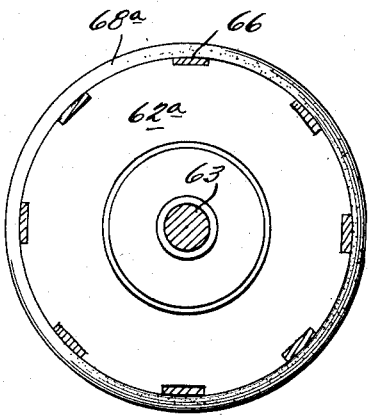
INVENTOR
JOHN EDWARD CHRISTIE
BY Mauro E. Lewis
ATTORNEYS

United States Patent Office 2,967,075
Patented Jan. 3, 1961

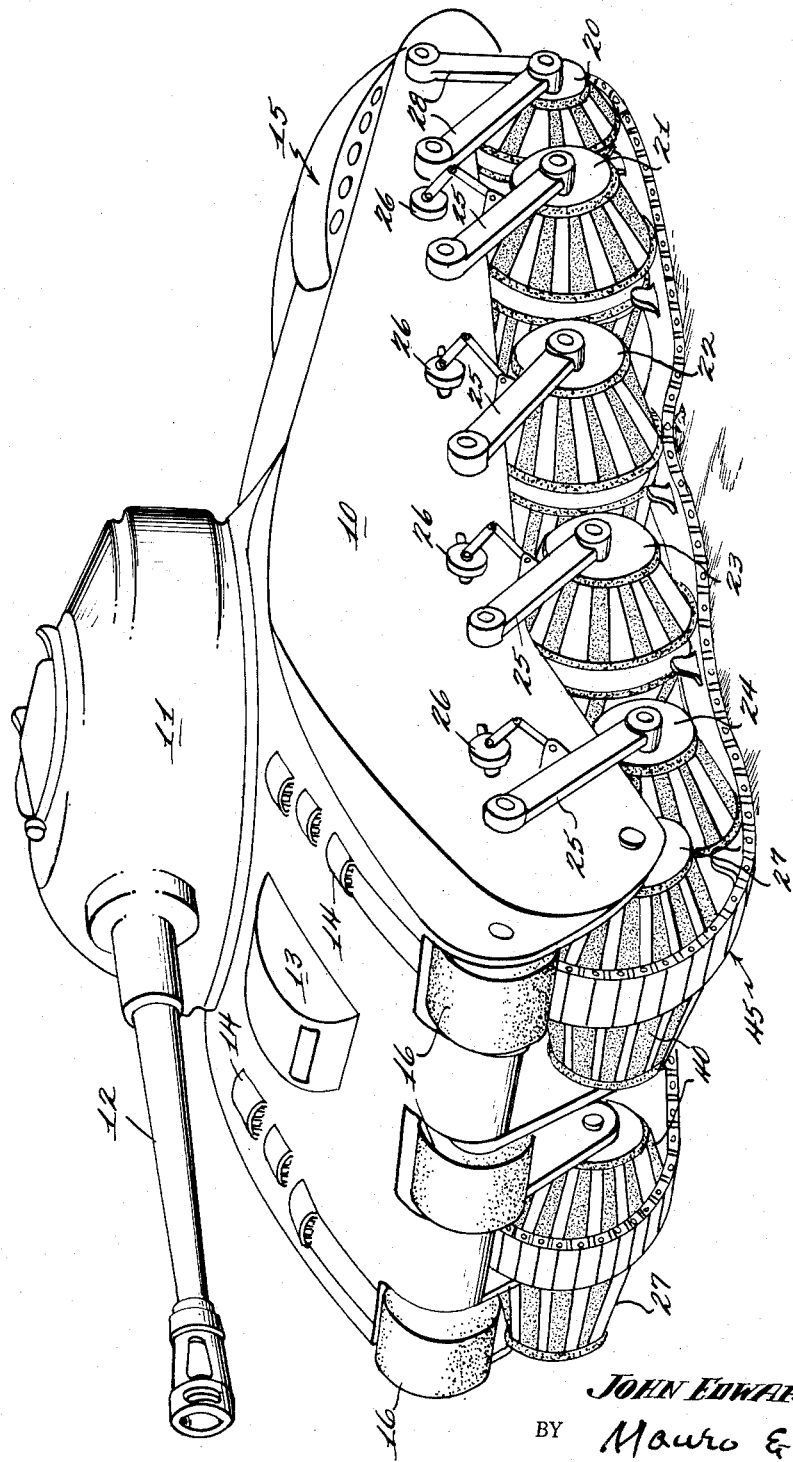

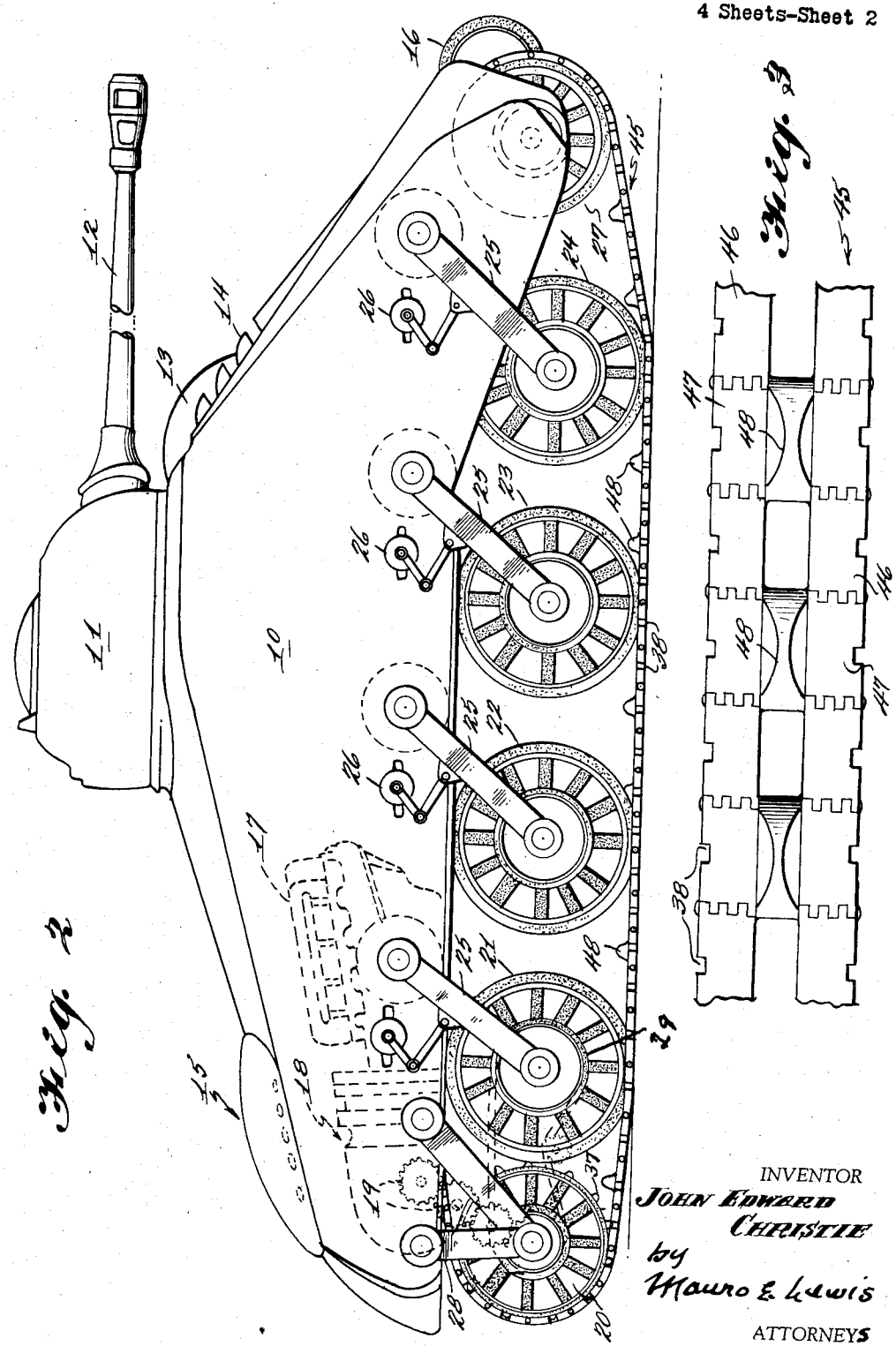

2,967,075

LAND VEHICLE WHEEL

John Edward Christie, 826 84th St., Miami Beach, Fla., assignor of one-half to E. Burke Wilford, Merion Station, Pa.

Filed July 31, 1957, Ser. No. 675,317

5 Claims. (Cl. 305—56)

This invention relates to a novel land vehicle wheel especially useful in connection with track-laying vehicles of military or commercial types. While the invention is shown by way of illustration in most views of the drawing as applied to a military tank, it will be understood that it is equally adaptable to other types of heavy duty equipment which may or may not require caterpillar tracks, such as cranes, bulldozers, troop trucks, road building vehicles and machines, and the like.

The invention constitutes a novel departure in wheel structures for transporting such heavy duty equipment with greater speed, maneuverability, endurance and stability than is afforded in conventional wheeled or track-laying vehicles.

The wheel of the invention may be conveniently described as being barrel-shaped in design, there being one or more disc wheels carrying treads centrally located at the center of the structure at the point of its greatest diameter. Spaced at either side of these wheels are other disc wheels of smaller diameter, the rims being interconnected by laterally disposed spokes or staves. In track-laying vehicles such as tanks, a track is carried by the two central disc wheels.

The wheel construction of this character provides a minimum of ground-engaging surface in the wheel when passing over good roads or hard ground.

When, however, soft terrain or uneven surfaces are encountered and the vehicle tends to become mired, the stave or spoke segments of the wheel engage the terrain and act in the manner of a paddle-wheel to provide added traction, pulling it through mud, snow, sand or the like with great efficiency. The wheel provides the unusual combination of traction and buoyancy when encountering soft ground conditions, allowing the vehicle to sink gradually to the point where sufficient added traction becomes available.

The wheel of the invention, because of the area of traction and the flexibility of its open-work design, is also unique in its ability to surmount rough terrain and to absorb shocks from stones, rocks and other objects.

Other and further advantages of the invention will be described in connection with the drawing, wherein:

Fig. 1 is a perspective view of a military tank embodying the wheel construction of the invention;

Fig. 2 is a similar view in elevation;

Fig. 3 is a detail of a track for use over the wheel of the invention;

Fig. 4 is an enlarged cross-section of one of the wheels, with suitable suspension means therefor;

Fig. 5 is an enlarged perspective of the wheel in Fig. 4;

Fig. 6 is a sectional view of a modified form of wheel suitable for trackless vehicles;

Fig. 7 is a sectional view on lines 7—7, Fig. 6; and

Fig. 8 is a sectional view on lines 8—8, Fig. 6.

In Figs. 1 and 2 a tank body is shown at 10, having a turret 11, gun 12, observation slit 13, ventilators 14, motor compartment 15, and front bumper wheels 16. In Fig. 2, suitable driving means are shown, these being engine 17, transmission and differential 18 and gear train 19 leading to rear driving wheel 20 which in turn may be connected to the next forward wheel 21 which is in constant ground engagement, as by chain drive 29.

Sprockets 37 (one being shown in Fig. 2) are centrally peripherally mounted in driving wheel 20 and drive the track 45 by engagement with the spaced sprocket slots 38, Fig. 3.

The series of wheels 21—22—23—24— (there being four on each side of the vehicle as noted from Fig. 1) are each carried by a suspension which includes the knee arms 25—25a and shock absorbers 26, arms 25—25a being independently spring mounted as will be further described. Front wheel 27 is of smaller diameter and is slightly elevated, normally not engaging the ground. Wheel 27 is journalled in the tank body 10. Driving wheel 20 is likewise fixedly mounted on the V-arms 28.

The wheel constructed according to the invention is shown on larger scale in Figs. 4 and 5. Centrally, the wheel is composed of a pair of metallic discs 30—30a having male-female mating flanges indicated at 31, secured together in spaced apart relation, as by bolts 32. Connected, as by welding to discs 30—30a, are axle tubes 33—33a, to which in turn are welded the smaller side discs 34—34a. Discs 30—30a—34—34a carry suitable bearings in which are located the axle rods 35—35a, in turn bolted to the knee arms 25—25a.

Around the peripheries of discs 30—30a—34—34a at spaced intervals milled slots 36—36a are provided in which may be mounted by welding the rubber coated steel spring staves 40—40a. After the staves are spot-welded in the slots 36—36a, rubber covered tire rims 42—42a and 43—43a are mounted over the discs 30—30a—34—34a and also welded in place. The staves above described are preferably of spring steel to provide considerable resiliency.

The provision of two spaced central discs such as 30—30a is desirable in the case of a track-laying vehicle for which a track generally indicated at 45, Fig. 3, is adaptable. Track 45 is composed of hinged links 46 alternating with links 47, the latter carrying the lugs 48, which, as seen in Figs. 4 and 5, engage the space formed between discs 30—30a. Track 45 has a width in excess of the combined width of discs 30—30a, hence its sides are supported flat on rims 43—43a.

To augment the driving connection provided by the sprockets 37 of driving wheel 20, connected to sprocket slots 38 of track 45, the alternate staves of the driving wheel 20 may be extended in one piece across the gap between central discs 30—30a, spaced in such manner that the lugs 48 will engage them. This feature is not shown in the drawing. As will be apparent from Figs. 4–5, the idler wheels do not require this feature.

The fact that the entire periphery of the wheel of the invention is rubber-covered in the form of the four rubber tired discs or the rubber-covered staves is a factor contributing to very quiet performance, even over rocky terrain.

As indicated generally in Fig. 4, a wheel such as above described is preferably mounted upon a pair of knee arms 25—25a which are in turn attached to horizontal shafts 50—50a independently cushioned against rotation as by suitable coil springs contained in housing 51.

It will be appreciated from the foregoing that a tank or other vehicle equipped with plural rows of wheels made according to the invention, as seen in Fig. 1, represents a structure having rotating ground-engaging surfaces across substantially the entire length and width thereof.

In Figs. 6–8 is illustrated a modified form of the invention consisting of a vehicle wheel, a plurality of which would be suitable for trackless vehicles.

The wheel generally indicated at 60 is an idler wheel, it being understood that one or more power wheels should be included in the plurality of wheels supporting the vehicle, which may be driven by suitable connections with the engine such as previously described.

Wheel 60 is composed of a single central disc 61 and a pair of relatively small-diameter side discs 62—62a, equally spaced to the sides of disc 61. Each disc is formed with a central hub of substantial size containing bearings for rotation of the wheel structure 60 on a non-rotating axle shaft 63, the latter being splined in and bolted to the supporting knee arms 64—64a which function in the same manner as described for knee arms 25—25a above described. Suitable dirt seals should be applied to the joints between the hubs and shaft 63.

As seen in Fig. 7, the periphery of central disc 61 is provided with a plurality of spaced milled slots 65, in which are welded the rubber covered staves 66, eight of which are illustrated. Staves 66 may be continuous as shown or in two parts, the center ends of which abut in the slots 65. The ends of staves 66 are similarly welded in slots 67 formed in the peripheries of the side discs 62—62a.

The assemblage is completed by capping all discs with suitable tires. As illustrated, discs 62—62a may carry solid tires 68—68a carried on rims welded in place. To cap disc 61, a suitable means is to form a flange 70 on its periphery as shown and press or weld against it a rim 71 carrying tire 72. A pneumatic tire may be substituted for tire 72 if desired.

The wheel for the trackless vehicle shown in Figs. 6–8 has the same traction characteristics as the tank or tracked vehicle wheel first described, and in fact may be applied to vehicles of types which would normally be intended for terrain which would require the extra traction afforded by a track.

What is claimed is:

1. In a track-carrying wheel structure, axle means, a pair of spaced centrally disposed wheel discs carried by said axle means, a pair of relatively smaller side wheel discs also carried by said axle means in spaced apart relation to each side of said centrally disposed wheel discs, said central wheel discs each being peripherally joined to the adjacent side disc by laterally extending openwork members forming added traction means, and an endless track mounted over said central wheel discs and having means extending into the space therebetween for retention thereon.

2. The invention according to claim 1, each disc being covered by resilient tire means.

3. The invention according to claim 1, the openwork members consisting of spaced resilient spokes.

4. The invention according to claim 1, the openwork members consisting of spaced resilient spokes covered by a rubberlike substance bonded thereto.

5. The invention according to claim 1, wherein the central wheel discs are separately formed and jointed together by mating hubs, and wherein hub housings carried by the central disc hubs extend to and join the adjacent side discs to provide dirt seals for said axle means.

References Cited in the file of this patent

UNITED STATES PATENTS

| | | |
|---|---|---|
| 658,969 | Walter | Oct. 2, 1900 |
| 1,635,854 | Miller | July 12, 1927 |
| 2,308,331 | Heaslet | Jan. 12, 1943 |
| 2,316,622 | Bigley | Apr. 13, 1943 |
| 2,393,369 | Hait | Jan. 22, 1946 |
| 2,599,233 | Christie | June 3, 1952 |
| 2,705,173 | Whelan | Mar. 29, 1955 |
| 2,706,663 | Heckerman | Apr. 19, 1955 |
| 2,787,913 | Hageline | Apr. 9, 1957 |

FOREIGN PATENTS

| | | |
|---|---|---|
| 484,929 | France | Aug. 28, 1917 |
| 581,515 | Great Britain | Oct. 15, 1946 |